United States Patent [19]
Verdier

[11] 3,765,468
[45] Oct. 16, 1973

[54] ASYMMETRICAL TIRE CASING

[75] Inventor: Henri Verdier, Beauregard-L'Eveque, France

[73] Assignee: Compagnie Generale des Etablissements Michelin, raison social Michelin & Cie, Clermont-Ferrand (Puy-de-Dome), France

[22] Filed: Feb. 23, 1971

[21] Appl. No.: 117,936

[30] Foreign Application Priority Data
Feb. 23, 1970 France .............................. 7006451

[52] U.S. Cl. ................................ 152/352, 152/354
[51] Int. Cl. .............................................. B60c 3/00
[58] Field of Search .................... 152/352, 353, 354, 152/361

[56] References Cited
UNITED STATES PATENTS
3,435,874   4/1969   Mirtain et al. ...................... 152/352
3,554,259   1/1971   Webb ................................. 152/352
3,422,874   1/1969   Weitzel .............................. 152/361

FOREIGN PATENTS OR APPLICATIONS
818,460   9/1937   France ............................... 152/352

Primary Examiner—Gerald M. Forlenza
Assistant Examiner—Robert Saifer
Attorney—Brumbaugh, Graves, Donohue & Raymond

[57] ABSTRACT

A tire casing has a crown the structure and thickness of which are symmetrical with respect to a bisecting surface normal thereto. However, the crown is rendered asymmetrical with respect to the median plane of the tire by forming therewith an angle less than 90°.

3 Claims, 3 Drawing Figures

PATENTED OCT 16 1973 3,765,468
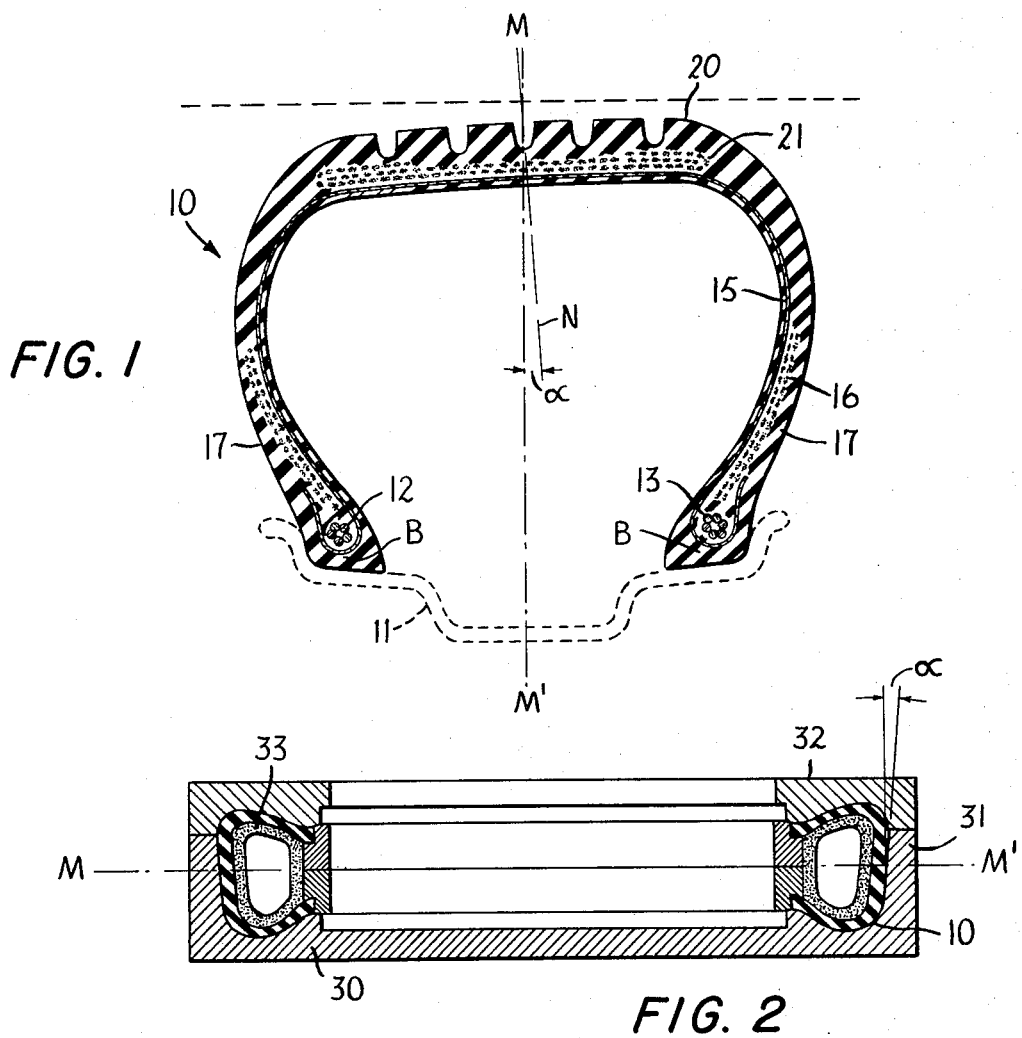
FIG. 1
FIG. 2
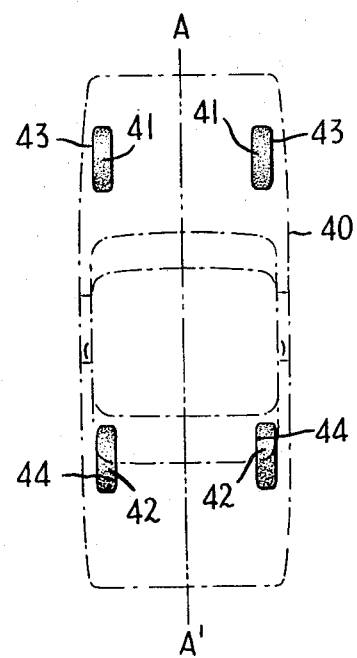
FIG. 3
INVENTOR.
HENRI VERDIER
BY
Brumbaugh, Graves, Donohue & Raymond
his ATTORNEYS

ASYMMETRICAL TIRE CASING

BACKGROUND OF THE INVENTION

This invention relates to tire casings and, more particularly, to novel and highly effective tire casings exhibiting asymmetry with respect to the median plane of the tire: i.e., the plane parallel to the planes containing the central lines of the tire bead wires (the axially innermost bead wires if there are several in each bead) and which is equidistant from such planes when the tire assumes the position it occupies on a rim when normally inflated and unloaded.

The advantage of an asymmetrical structure for a tire casing and in particular for its crown was disclosed for the first time in French Pat. No. 1,342,822 and in its U.S. counterpart Pat. No. 3,231,000. In that patent, tire casings comprising a crown reinforce-ment which is asymmetrical with respect to the median plane were described.

While an asymmetrical structure confers undeniable advantages, it has certain drawbacks relating on the one hand to manufacture and on the other hand to the properties of the tire.

With respect to manufacture, the conventional asymmetric structure has the drawback of being comparatively difficult and costly to produce. Since the two halves of the crown of the tire casing on opposite sides of the median plane are not identical, it is necessary in order to obtain asymmetry to carry out one or more additional operations or to use one or more additional elements or products. Furthermore, the precise determination of the degree of asymmetry is difficult, particularly when this degree of asymmetry is of an order of magnitude which only slightly exceeds that of the random asymmetry coming from unforeseeable and inevitable differences in manufacture in a theoretically symmetrical tire.

With respect to the properties of the tire, the conventional asymmetric structure has the drawback that the degree of asymmetry changes as a function of tire wear and speed. It changes as a function of tire wear since wear may increase or decrease the degree of asymmetry and a tire that has traveled a certain number of miles may be rather difficult from a new tire. It changes as a function of tire speed since under the effect of centrifugal force the two halves of the crown on opposite sides of the median plane may deform differently.

SUMMARY OF THE INVENTION

An object of the invention is to provide an improved tire casing with an asymmetrical crown that alleviates the disadvantages noted above. In particular, an object of the invention is to provide a tire casing having a type of asymmetry that is insensitive to the speed and age of the tire and that furthermore does not result in any additional cost of production as compared with symmetrical tires, and even results in a better uniformity of construction.

The foregoing and other objects are attained in accordance with the invention by the provision of a tire casing of asymmetric structure characterized in that the different constituent elements of the crown (tread, crown reinforcement, carcass) all form with the median plane of the tire an angle other than 90° while having identical characteristics and in particular identical thicknesses on opposite sides of the median plane and at equal distances from it. Thus, while the crown has a structure and thickness symmetrical with respect to a bisecting surface normal thereto, it is rendered asymmetrical with respect to the median plane of the tire by forming therewith an angle less than 90°.

The elements of the crown form with the median plane an angle that differs from 90° by a value between 0°15' and 3° and preferably between 0°45' and 2°.

The method of manufacturing a tire in accordance with the invention comprises producing a raw tire that is symmetrical with respect to the median plane and curing the raw tire in a mold whose peripheral part which comes into contact with the tread forms an angle other than 90° with the median plane, the tire being forced against the mold in a conventional manner by means of a membrane or curing bag.

The tire in accordance with the invention is asymmetrical because of a deformation or "taper" of the total constituent elements of the crown. All of the perpendiculars to the tread, to the carcass and to the crown reinforcement, along the central line of the tread, thus form a bisecting surface in the shape of a cone and not a plane. The structures and thicknesses of the various component elements of the crown are identical at equal distances from the median plane. This makes the asymmetry independent of or only slightly dependent on the age and speed of the tire.

A taper of the order of 1° to 2° is sufficient to affect the appearance of the tire. Smaller tapers can easily be detected by measuring the circumference of the tread along its two edges. A difference in circumference of the order of 2 mm for a standard passenger car tire size corresponds to an angle of taper of the order of one-fourth of a degree. In the preferred embodiment of the invention, this difference in circumference is of the order of 10 to 25 mm, the difference in diameter of the edges of the tread being of the order of 3 to 8 mm.

The tires in accordance with the invention are advantageously mounted at the front of the vehicle with the side of the tread of small diameter always towards the outside and at the rear of the vehicle with the side of small diameter always towards the inside. At the rear of the vehicle, the tires can also be mounted with the side of small diameter towards the outside, though this is generally less desirable. In any case, the tires on any given axle are mounted with an orientation such that they form a symmetrical structure with respect to the longitudinal axis of the vehicle: i.e., both tires have the small diameter towards the outside, or both tires have the small diameter towards the inside.

The tires in accordance with the invention, properly mounted on an automotive vehicle, yield the following advantages:

a. Increased precision and comfort in driving, both straight ahead and on turns;

b. Improvement of the adherence to wet, smooth road surfaces because of a better drying of the ground due to unequal contact pressures of the two sides of the tires;

c. Absence of reaction upon passage at high speed over a puddle of water (customarily the puddle of water causes a veering of the wheel concerned and this veering is prevented by the taper of the crown).

The tires in accordance with the invention do not suffer any substantial defect from the standpoint of wear, endurance, speed limit, or rolling resistance, in contrast to tires having a tapered tread of variable thickness. Thus, the parallelism of the surfaces defining the tread, the crown reinforcement and the carcass plays a very important role. If there is any variation in thickness, it must characterize only the central portion as compared to the edges of the crown and not one edge as compared to the other.

One entirely unforeseeable advantage of the invention is that the molding in a tapered mold has a tendency to make the manufacture uniform. In a series of tires manufactured in this manner, the standard deviation from the average is less than in a series of otherwise identical tires which have, however, been molded in a symmetrical mold.

BRIEF DESCRIPTION OF THE DRAWING

An understanding of other aspects of the invention can be gained from a consideration of the following detailed description of a preferred embodiment thereof, in conjunction with the appended figures of the drawing, wherein:

FIG. 1 is a fragmentary view in radial section of a tire in accordance with the invention;

FIG. 2 is a view in radial section of a mold for the manufacture of a tire in accordance with the invention; and FIG. 3 is a schematic plan view of an automotive vehicle showing the mounting of tires in accordance with the invention.

DESCRIPTION OF THE PREFERRED EMBODIMENTS

FIG. 1 shows a tire 10 mounted on a rim 11 (shown in dotted line). The tire beads B respectively include two steel bead wires 12 and 13. The median plane M—M' of the tire 10 is at an equal distance from the bead wires 12 and 13 and parallel to the planes containing the central lines (not shown) of the bead wires.

The tire 10 comprises a carcass 15 made of cables arranged in radial planes, reinforcements 16 in each sidewall 17, a tread 20, and a crown reinforcement 21 made of a plurality of plies of metal cables.

In the region of the crown, that is to say, over the entire width of the crown reinforcement 21 or of the tread 20, the different component parts of the crown, namely the carcass 15, the tread 20 and the top reinforcement 21, are applied directly against each other and have identical structures on both sides of the median plane M—M'. On the other hand, the assembly of these parts does not occupy a symmetrical position with respect to the median plane M—M', the assembly having been tilted so that the median plane M—M' and the normal N to the tire at the point of intersection with the median plane M—M' form an angle $\alpha$ with respect to each other.

By way of example, the angle $\alpha$ has been selected equal to 0°50' in one case and to 1°40' in another case for a tire of size ER 70-15. The lateral thrust which these inclinations cause a tire to exhibit when inflated to a pressure of $1.5 \times 10^5$ newtons per square meter and placed under different loads is given below in kg:

Loads of:

| Angle $\alpha$ | 200 kg | 400 kg | 600 kg | 800 kg |
|---|---|---|---|---|
| 0°50' | 1,75 | 7,20 | 13,45 | 16,60 |
| 1°40' | 6,45 | 21,45 | 47,55 | 69,65 |

The lateral thrust acts on the tire in the direction of the decreasing diameters.

Comparative tests on tires in accordance with the invention with an angle $\alpha$ of 0°50' and 1°40' on the one hand and on the other hand on tires differing therefrom only by an angle $\alpha$ of zero show that the wear properties, rolling resistance at 235 km/hour, and speed limit, are practically unchanged. In particular, the loss in weight by wear after travel for 15,000 km is the same within 2 percent, which is surprising in view of the large amount of the lateral thrust, which reaches 2 to 4 percent of the load involved.

The difference in diameter between the two edges of the tread is, of course, accommodated by the slightly different shape of the sidewalls between the reinforcements 16 and the crown reinforcement 21.

FIG. 2 shows in radial section a mold for the manufacture of a tire in accordance with the invention.

The mold comprises a first element 30 that corresponds to one of the sidewalls and to the tread and a second element 32 that corresponds to the other sidewall and that closes the mold. The surface of the portion 31 of the part 30 corresponding to the tread is inclined by angle of 90°—$\alpha$ with respect to the median plane M—M'. The large diameter of the tire is adjacent to the smaller mold element 32, which does not extend over the tread. The sign or polarity of the inclination of the surface of the portion 31 corresponding to the tread is such as to facilitate the removal of the tire from the mold.

The tire to be vulcanized, as introduced into the mold, is perfectly symmetrical with respect to the median plane of the bead wires—it may be in the form of a blank that is either cylindrical or toroidal. The pressure applied to the blank by a diaphragm or a curing bag 33 filled by a fluid under pressure permits it to assume the shape of the mold without changing the relative arrangement of the tread, the crown reinforcement and the carcass, and without changing their thicknesses in one region as compared to another. Thus, the crown portion of the tire is reshaped before vulcanization so that it is asymmetrical with respect to the median plane of the tire but remains symmetrical with respect to a bisecting surface normal thereto. The tire is vulcanized with the crown portion in its reshaped form.

The method in accordance with the invention reduces the differences among the tires of one and the same series. When a thrust is introduced by a taper that is systematic rather than random, the differences are reduced both in absolute value and particularly in relative value. Furthermore, the direction of the thrust is no longer random but uniform over all tires of the series and can be indicated by a marking made upon the molding of the tire, which facilitates mounting by the user.

FIG. 3 shows the method in accordance with the invention of employing four asymmetrical tire casings each formed with a conical crown on an automotive vehicle 40. A first pair 41 of the tires is mounted at the front of the vehicle 40 on opposite sides thereof, and a second pair 42 of the tires is mounted at the rear of the vehicle 40 on opposite sides thereof. The first pair 41 is mounted in such a manner that, in the case of each tire the side 43 of the crown of smaller diameter is on the outside of the vehicle. The second pair 42 is mounted in such a manner that they form a symmetrical structure with respect to the longitudinal axis A—A' of the vehicle 40. Specifically, the tires of the second pair 42 are mounted in such a manner that, in the case of each tire, the side 44 of the crown of smaller diameter is on the inside of the vehicle 40.

Although the drawings and examples refer particularly to a tire with a radial carcass, the invention applies also to a tire with a crossed carcass, with or without a crown reinforcement.

Thus there are provided in accordance with the invention novel and highly effective tires having a new and improved type of asymmetry, an economical and reliable method of making them, and a particularly advantageous method of employing them.

Many modifications of the preferred embodiments described above will readily occur to those skilled in the art. For instance, the angle $\alpha$ can have values other than those specifically given as examples. Accordingly, the invention is to be construed as including all the embodiments thereof within the scope of the appended claims.

I claim:

1. A tire casing comprising a pair of beads each having a bead base, a pair of sidewalls respectively connected to said beads, and a crown extending between said sidewalls, said beads and sidewalls being symmetrical with respect to the median plane of said tire, said bead bases being equally spaced from the axis of the tire, and said crown (a) comprising a tread, a crown reinforcement and a portion of a carcass, each being symmetrical with respect to a bisecting surface normal to said crown, (b) having a thickness symmetrical with respect to said bisecting surface and (c) being rendered asymmetrical with respect to the median plane of said tire by forming therewith an angle less than 90°.

2. A tire casing according to claim 1 wherein said angle differs from 90° by a value $\alpha$ within the range of 0°15' to 3°.

3. A tire casing according to claim 1 wherein said angle differs from 90° by a value $\alpha$ within the range of 0°45' to 2°.

* * * * *

PO-1050
(5/69)

UNITED STATES PATENT OFFICE
CERTIFICATE OF CORRECTION

Patent No. __3,765,468__  Dated __October 16, 1973__

Inventor(s) __Henri Verdier__

It is certified that error appears in the above-identified patent and that said Letters Patent are hereby corrected as shown below:

On the Title Page, in the identification of the Assignee [73], "social" should be --sociale--; Column 1, line 17, "reinforce-ment" should be --reinforcement--; line 44, "difficult" should be --different--; and Col. 4, line 20, before "angle" insert --an--.

Signed and sealed this 21st day of May 1974.

(SEAL)
Attest:

EDWARD M.FLETCHER,JR.
Attesting Officer

C. MARSHALL DANN
Commissioner of Patents